United States Patent [19]
Sciullo et al.

[11] Patent Number: 6,065,792
[45] Date of Patent: May 23, 2000

[54] SLIDE-A-BED SYSTEM FOR A TRUCK

[76] Inventors: John E. Sciullo, 12662 Hunters Ridge Dr., Bonita Springs, Fla. 33923; Scott M. Burns, P.O. Box 2071, Blowing Rock, N.C. 28605

[21] Appl. No.: 09/176,408

[22] Filed: Oct. 20, 1998

Related U.S. Application Data

[63] Continuation-in-part of application No. 08/869,316, Jun. 5, 1997, abandoned.

[51] Int. Cl.[7] .................................................. B60P 1/52
[52] U.S. Cl. ....................................... 296/26.09; 414/522
[58] Field of Search ............................ 296/26.08, 26.09, 296/26.1, 26.11; 414/522; 108/44

[56] References Cited

U.S. PATENT DOCUMENTS

| | | | |
|---|---|---|---|
| 2,788,137 | 4/1957 | Harkness | 414/522 |
| 2,852,303 | 9/1958 | Hopson | 296/26 |
| 3,004,790 | 10/1961 | Mayer | 296/57.1 X |
| 4,685,857 | 8/1987 | Goeser et al. | 296/26 X |
| 4,841,883 | 6/1989 | Kukovich, Jr. | 414/522 X |
| 4,993,088 | 2/1991 | Chudik | 296/26 X |
| 5,098,146 | 3/1992 | Albrecht et al. | 296/26 |
| 5,393,192 | 2/1995 | Hall et al. | 296/26 X |
| 5,649,731 | 7/1997 | Tognetti | 296/26 |

*Primary Examiner*—Joseph D. Pape

[57] ABSTRACT

A slide-a-bed system for a truck including a pair of flat bars. The flat bars are mounted to a truck bed and have a plurality of rollers fixedly attached. An S-bar is mounted to the truck bed and spaced between the pair of flat bars. The S-bar has a plurality of rollers fixedly attached. Finally, included is a generally rectangular slab member. The slab member has a front lip and a pair of elongated side portions that are fixedly attached thereto. The slab member has a bottom side with at least three angle irons fixedly attached. The slab member is seated within the truck bed for resting on the plurality of rollers of the pair of flat bars and the S-bar. The plurality of rollers of each flat bar are positioned adjacent a respective angle iron. The plurality of rollers of the S-bar are positioned adjacent another of the respective angle irons. The slab member is capable of sliding in and out of the truck bed when positioned on the plurality of rollers for extending beyond the truck bed.

12 Claims, 11 Drawing Sheets

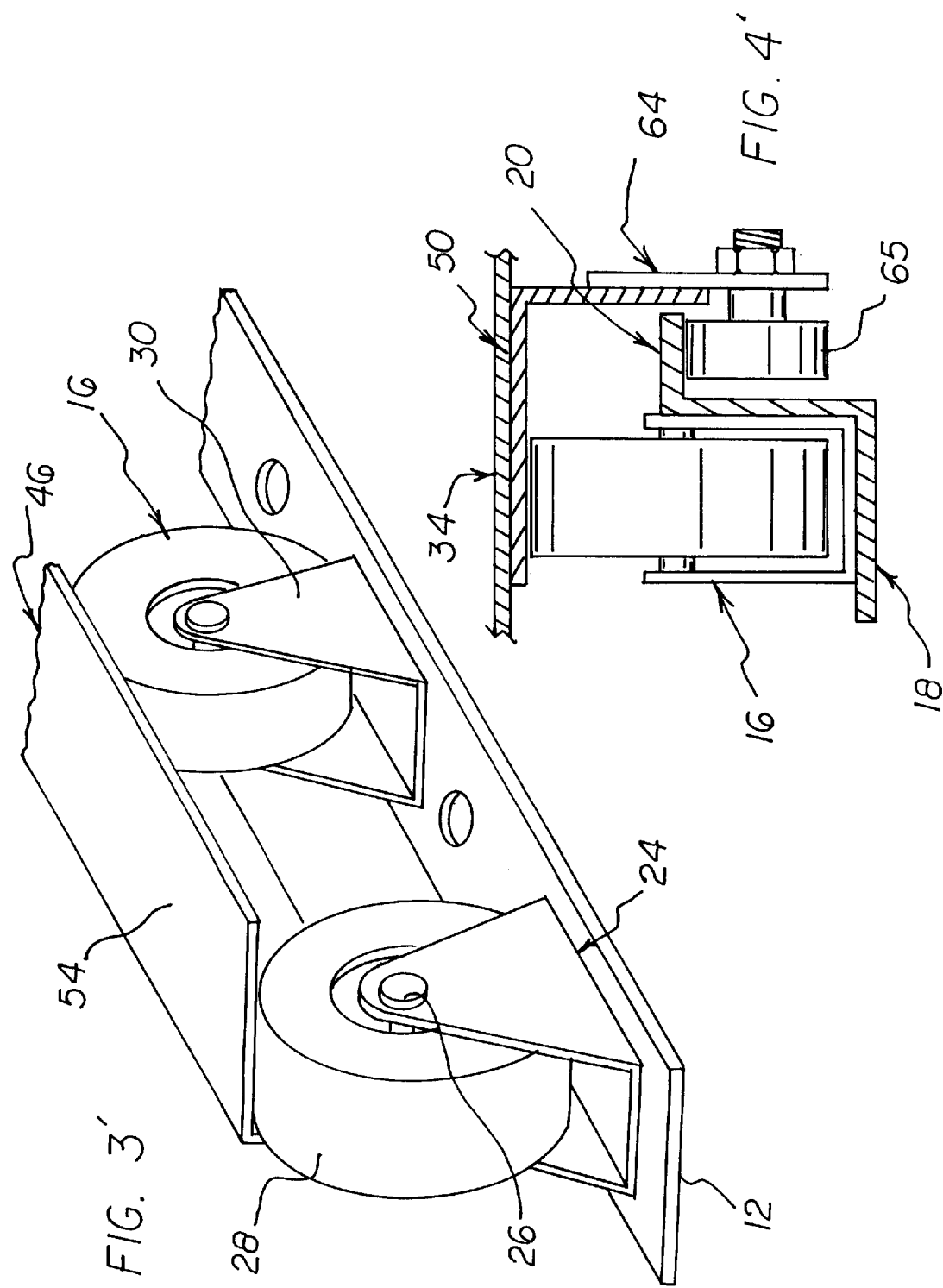

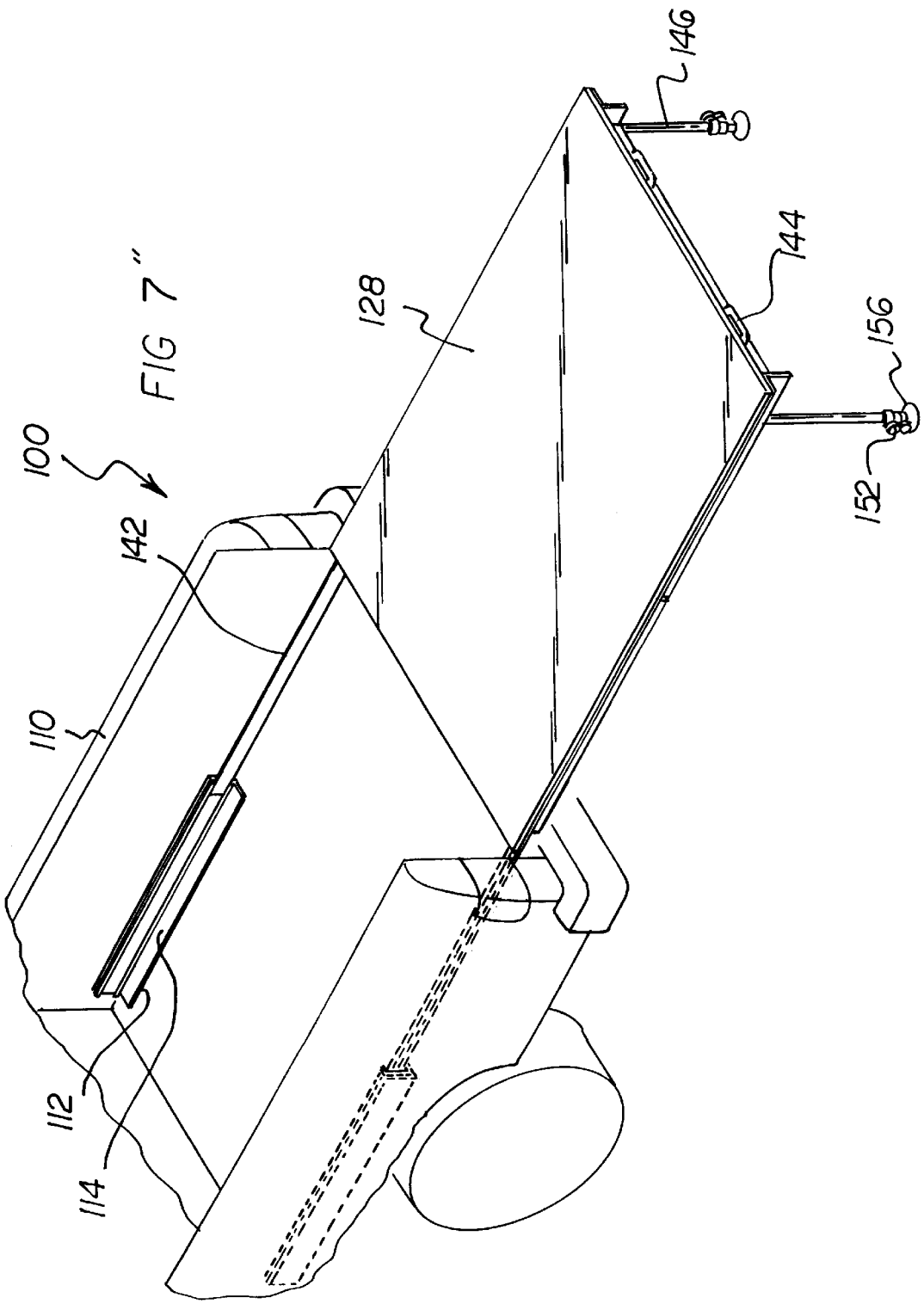

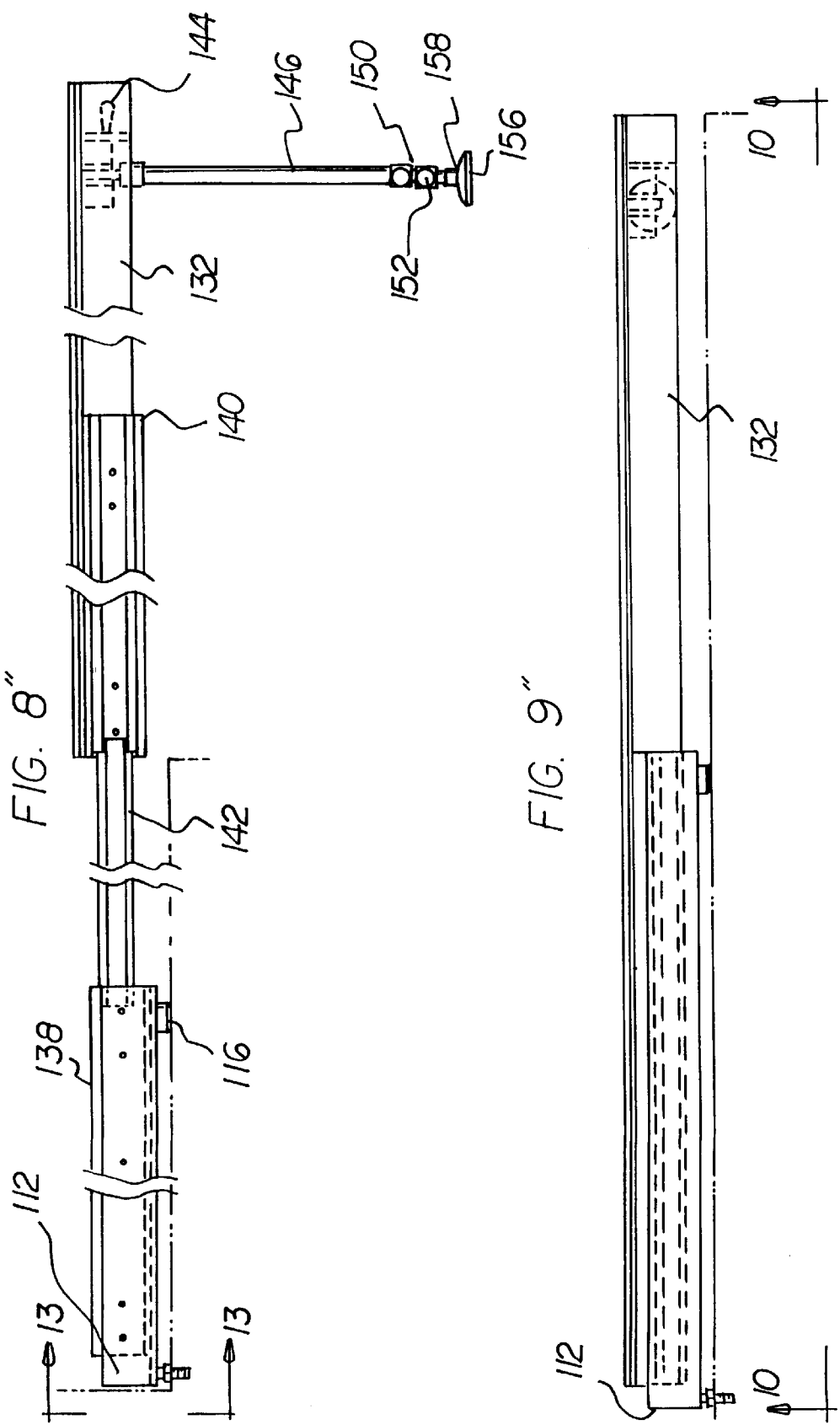

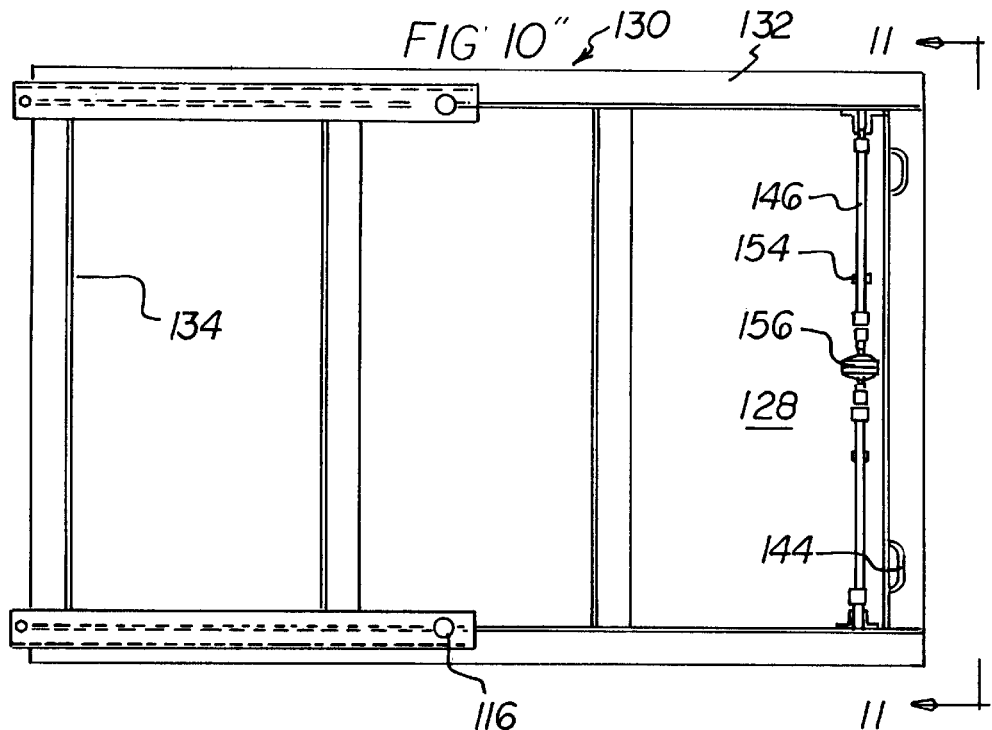
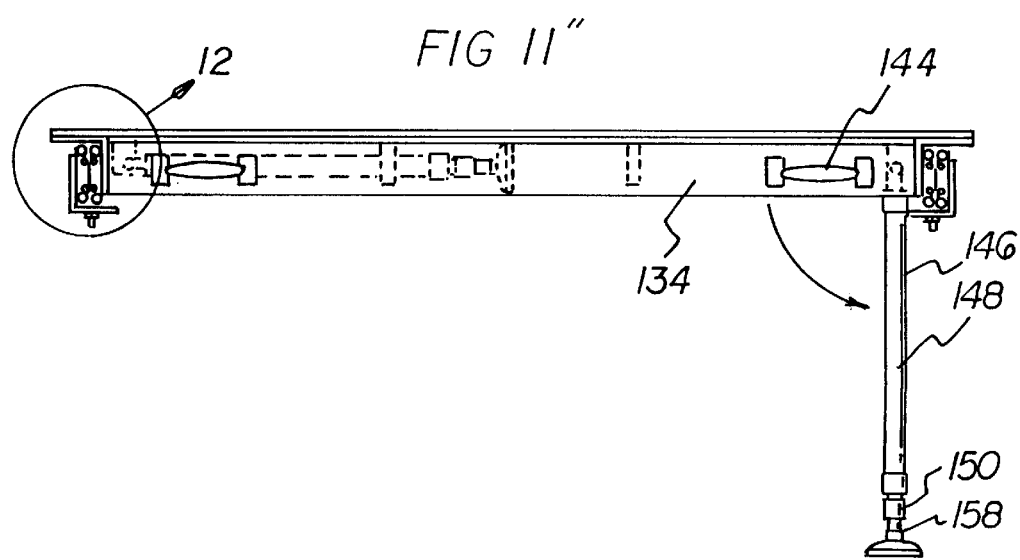

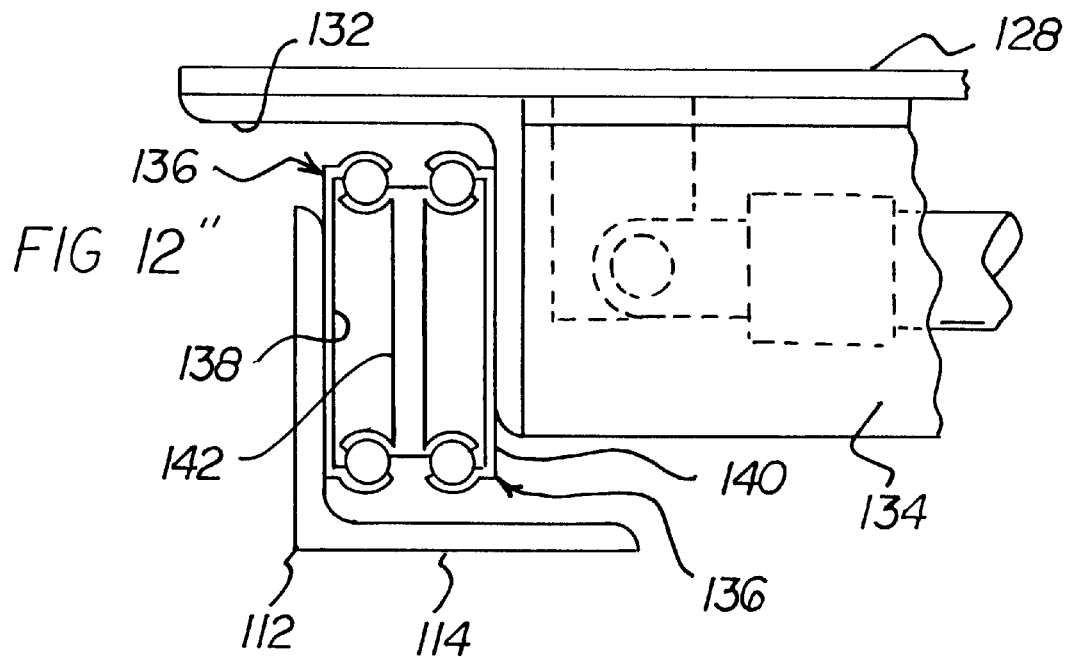
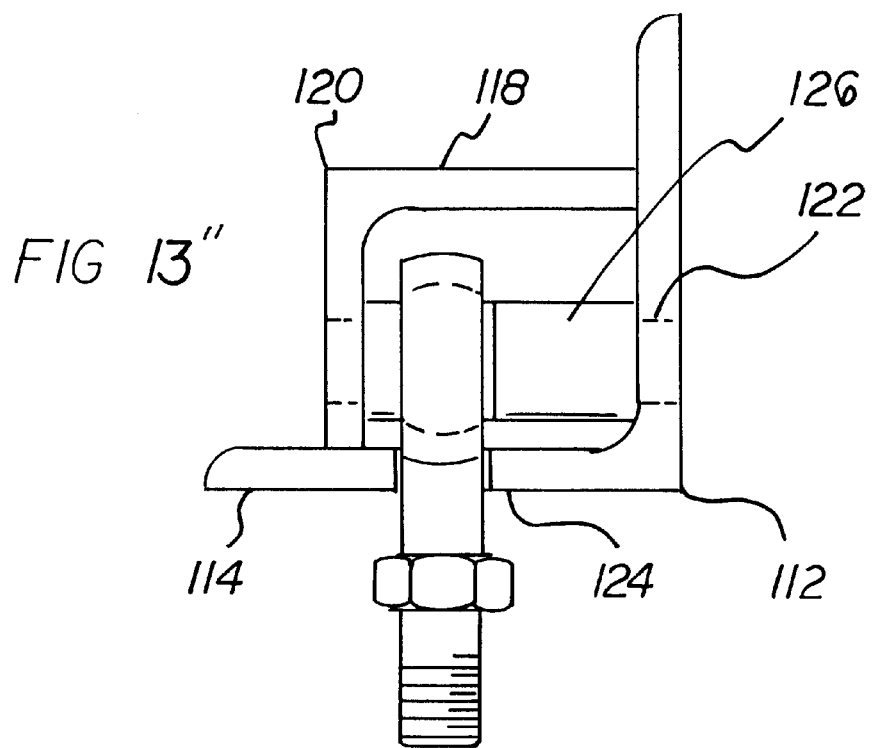

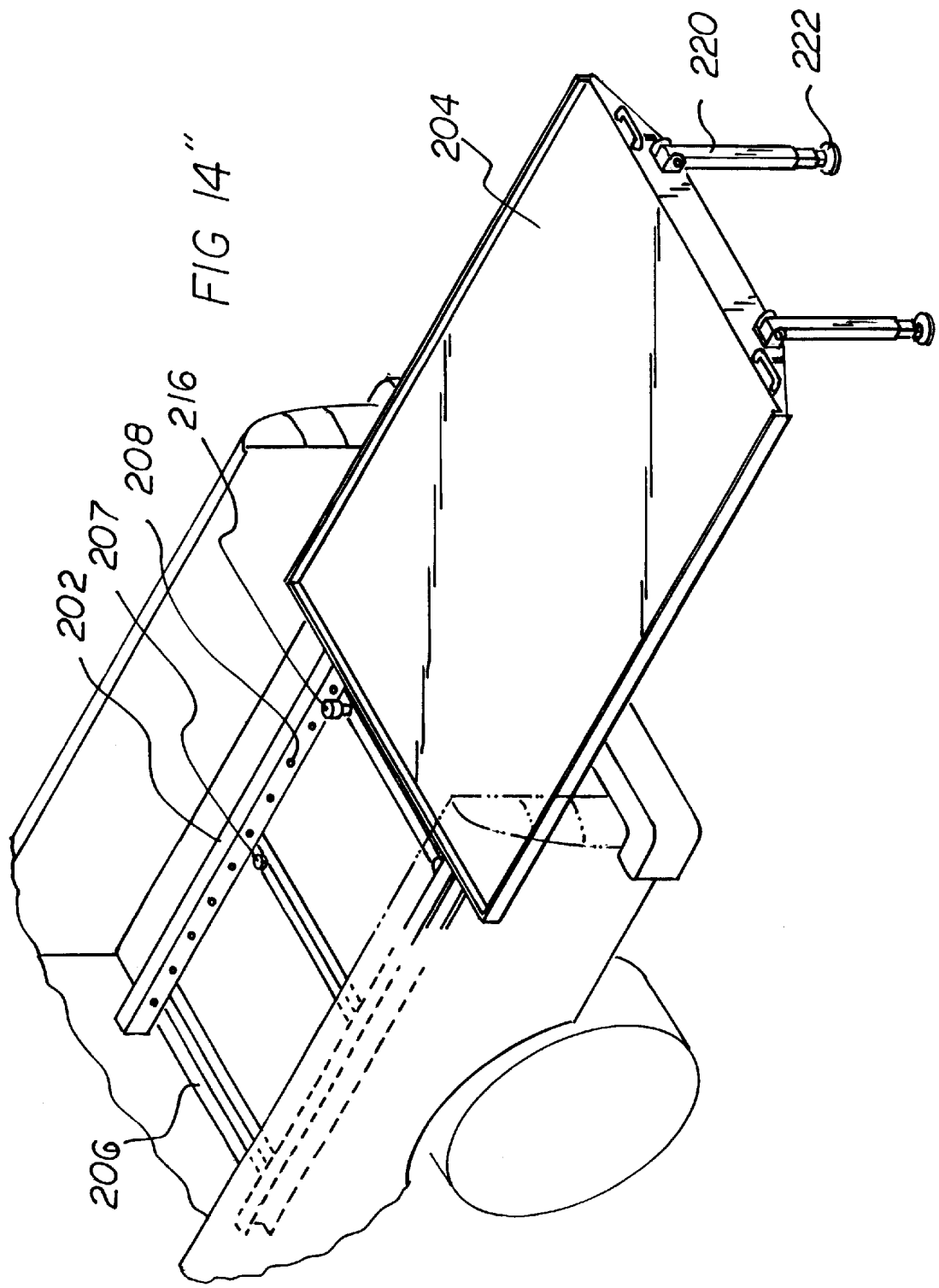

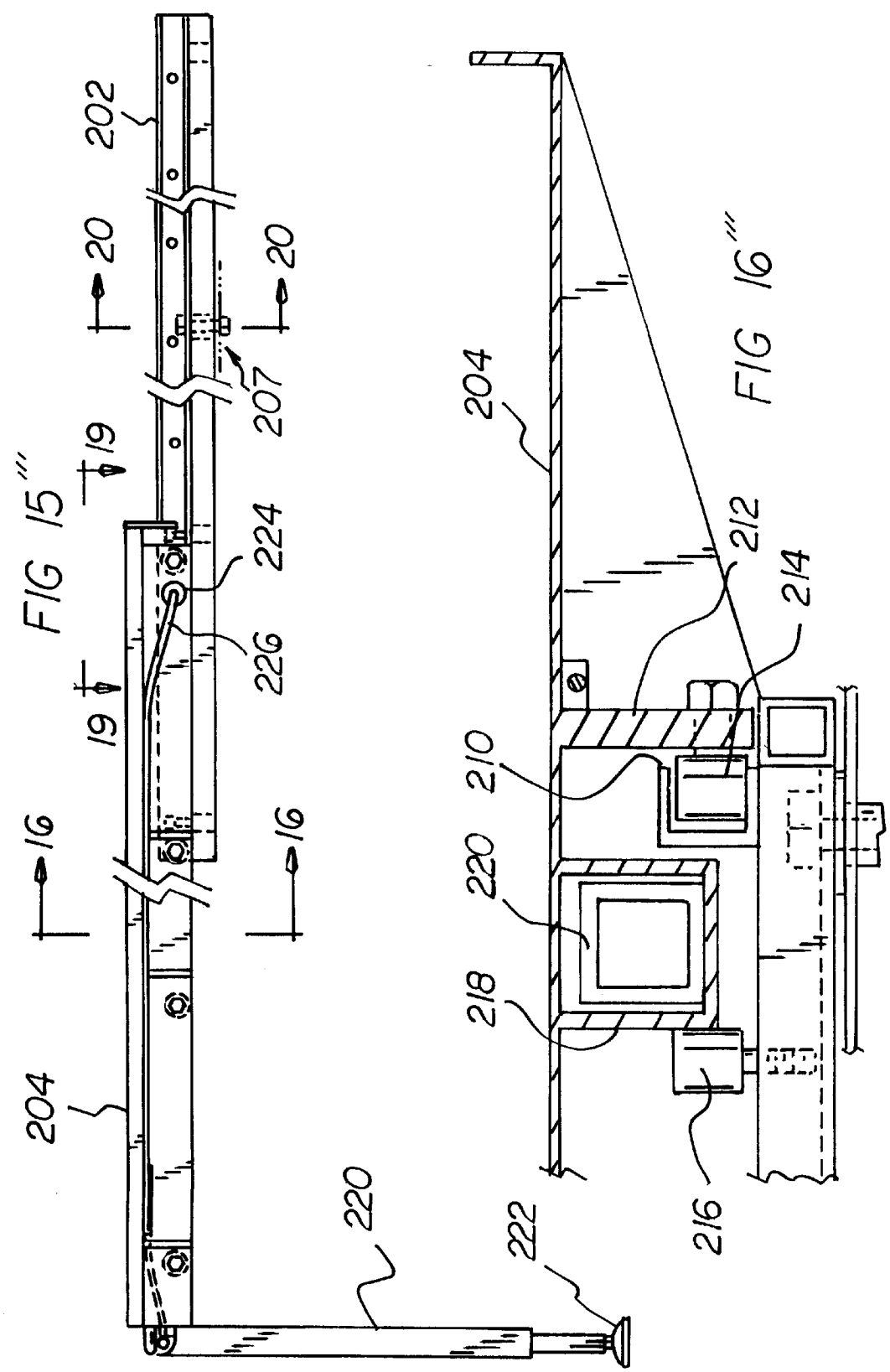

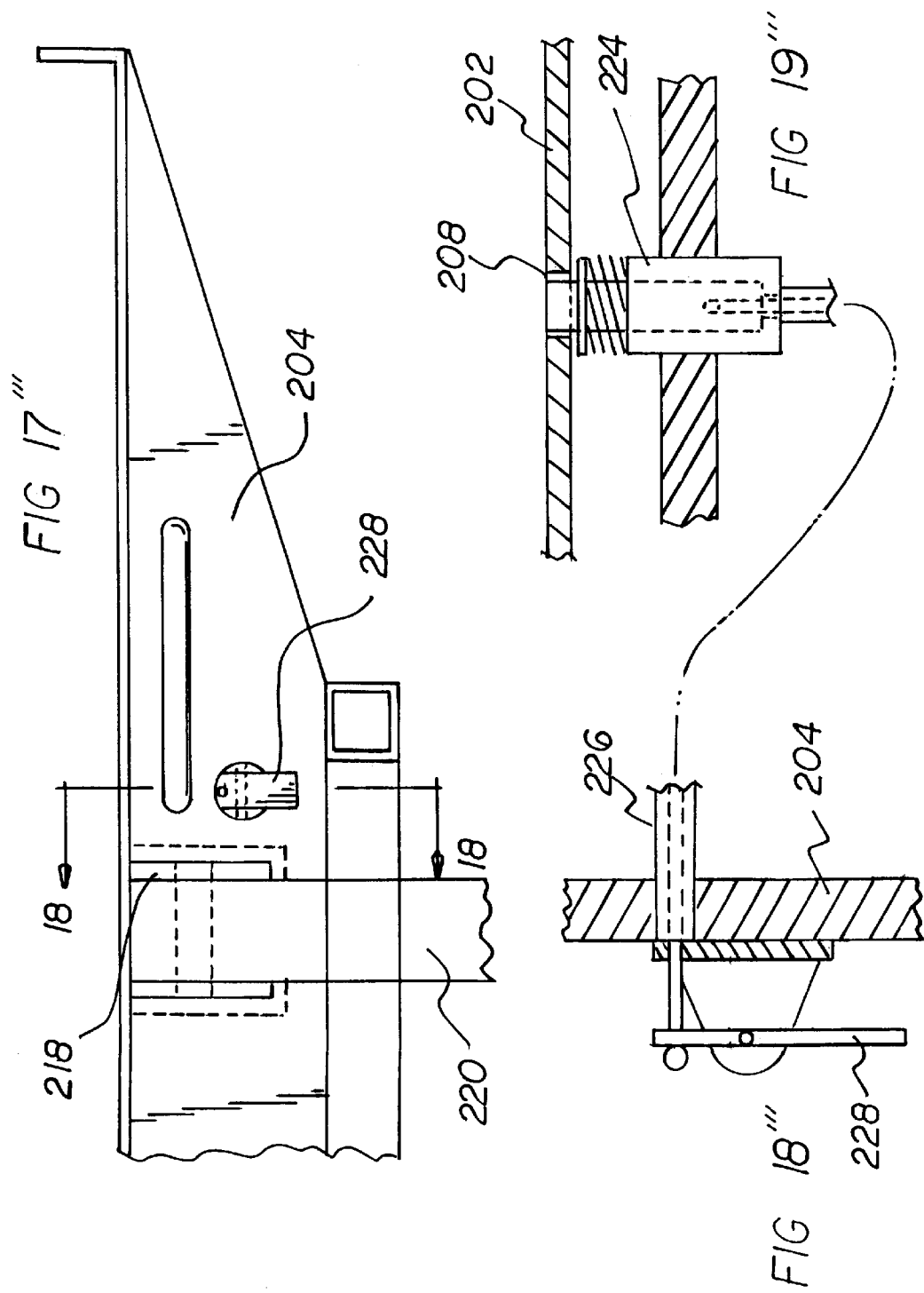

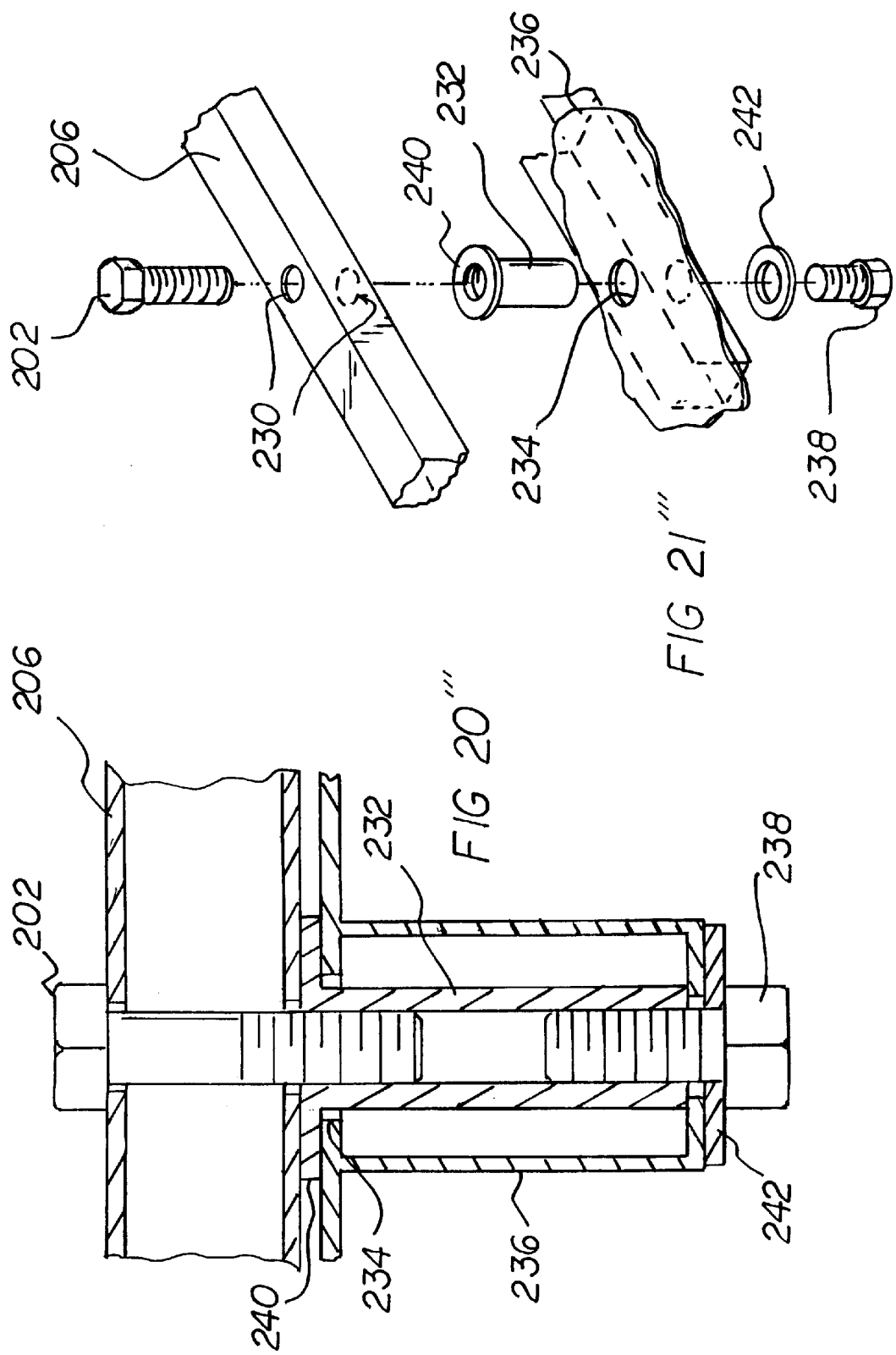

SLIDE-A-BED SYSTEM FOR A TRUCK

RELATED APPLICATION

This application is a continuation-in-part application of a parent application filed Jun. 5, 1997 under Ser. No. 08/869,316, abandoned.

BACKGROUND OF THE INVENTION

1. Field of the Invention

The present invention relates to a slide-a-bed system for a vehicle such as a truck or a van or sports utility vehicle, and more particularly pertains to extending the length of a truck bed for use as a work table and further providing a way to load and unload items from the truck.

2. Description of the Prior Art

The use of a bed assembly for a truck is known in the prior art. More specifically, bed assemblies for trucks heretofore devised and utilized for the purpose of loading and unloading materials are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,501,500 to Cannon discloses a truck bed extension apparatus. Cannon has an elongated plate, shaped to fit within a pick up truck bed, that extends past the end of a opened tail gate on the truck. The plate served to extend the usable length of the truck bed. The plate is support by two stabilizers bars and telescoping adjustable tubular supports at the front end. The rear end of the plate is supported by an under carriage.

U.S. Pat. No. 5,393,192 to Hall and Risner discloses an underfloor extendible ramp for vehicles. Hall has a tray mountable under the floor of a vehicle, which tray contains an extendible ramp mechanism. The ramp mechanism has a ramp and a driving panel. The ramp is fulcrumed intermediate its ends on the other ends of parallel arms extending from the driving panel.

U.S. Pat. No. 5,052,878 to Brockhaus discloses a retractable bed for a truck. Brockhaus in a retractable bed that has two or more telescoping rail packs with a deck attached therebetween for supporting a cargo.

U.S. Pat. No. 4,993,088 to Chudik discloses a portable bed assembly for motor vehicles. The portable bed assembly has an elongated framework that has a width designed to fit between rear wheel wells on a motor vehicle, and a length which fits snugly with the vehicle when the rear is closed. The portable bed is mounted on rollers which ride on rails mounted on the original deck or bed of the motor vehicle.

U.S. Pat. No. 4,685,857 to Goeser and Eickhoff discloses a vehicle-carrying apparatus. The adjustable load-carrying apparatus is designed for mounting on the load-carrying bed of a vehicle. It has a base frame assembly that is fixed rigidly to the vehicle bed and has laterally spaced inwardly facing rollers in longitudinal alignment along each side edge there of plus an inward lock guide rail. Additionally, Goeser et al. has a slidable platform frame assembly that has lateral trackways slidably mated with the rollers of the base frame.

U.S. Pat. No. 2,852,303 to Hopson discloses a truck body extension. Lastly, U.S. Pat. No. 2,766,959 to Duncan discloses an attaching means for an extension table slide mechanism.

In this respect, the slide-a-bed system for a truck according to the present invention substantially departs from the conventional concepts and designs of the prior art, and in so doing provides an apparatus primarily developed for the purpose of extending the length of a truck bed for use as a work table and further providing a way to load and unload items from the truck.

Therefore, it can be appreciated that there exists a continuing need for a new and improved slide-a-bed system for a truck which can be used for extending the length of a truck bed for use as a work table and further providing a way to load and unload items from the truck. In this regard, the present invention substantially fulfills this need.

SUMMARY OF THE INVENTION

In view of the foregoing disadvantages inherent in the known types of bed assemblies for trucks now present in the prior art, the present invention provides an improved slide-a-bed system for a truck. As such, the general purpose of the present invention, which will be described subsequently in greater detail, is to provide a new and improved slide-a-bed system for a truck which has all the advantages of the prior art and none of the disadvantages.

To attain this, the present invention essentially comprises a pair of flat bars that are mounted to a truck bed and each have a length equal to about 85 percent of a length of the truck bed. Each flat bar has a plurality of rollers fixedly attached and proportionately spaced along the length thereof. An S-bar is mounted to the truck bed and proportionately spaced between the pair of flat bars. The S-bar has a length equal to the length of the pair of flat bars. The S-bar has a plurality of rollers fixedly attached and proportionately spaced along the length thereof. Included is a generally rectangular slab member. The slab member has a front lip and a pair of elongated side portions that are fixedly attached. The slab member has a top side and a bottom side with at least three angle irons fixedly attached. Each of the three angle irons has a free member projecting downwardly from the bottom side of the slab member. The three angle irons form two outside angle irons and a center angle iron. One of each of the two outside angle irons has the free member spaced from one of the pair of elongated side portions for forming a roller channel. The center angle iron is symmetrically spaced between the two outside angle irons. The slab member is seated within the truck bed for resting on the plurality of rollers of the pair of flat bars and the S-bar. The plurality of rollers of each flat bar are positioned within a respective roller channel. The slab member may be slid in and out of the truck bed when positioned on the plurality of rollers. Included is a plurality of slot cam rollers capable of engaging the S-bar. Lastly, a pair of leg support members are rotatably mounted to the lip of the slab member. Each of the leg support members has a leg extension and a foot member. Each of the leg extensions of each leg support member is telescopingly extendable from within the respective leg support member. The pair of leg support members are capable of supporting the slab member on a receiving surface when the slab member is extended from beyond the truck bed.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved slide-a-bed system for a truck which has all the advantages of the prior art bed assemblies for trucks and none of the disadvantages.

It is another object of the present invention to provide a new and improved slide-a-bed system for a truck which may be easily and efficiently manufactured and marketed.

It is a further object of the present invention to provide a new and improved slide-a-bed system for a truck which is of a durable and reliable construction.

An even further object of the present invention is to provide a new and improved slide-a-bed system for a truck which is susceptible of a low cost of manufacture with regard to both materials and labor, and which accordingly is then susceptible of low prices of sale to the consuming public, thereby making such slide-a-bed system for a truck economically available to the buying public.

Still yet another object of the present invention is to provide a new and improved slide-a-bed system for a truck which provides in the apparatuses and methods of the prior art some of the advantages thereof, while simultaneously overcoming some of the disadvantages normally associated therewith.

Still another object of the present invention is to extend the length of a truck bed for use as a work table and further providing a way to load and unload items from the truck.

Lastly, it is an object of the present invention to provide a new and improved slide-a-bed system for a truck that has a pair of flat bars. The flat bars are mounted to a truck bed and have a plurality of rollers fixedly attached. An S-bar is mounted to the truck bed and spaced between the pair of flat bars. The S-bar has a plurality of rollers fixedly attached. Finally, included is a generally rectangular slab member. The slab member has a front lip and a pair of elongated side portions that are fixedly attached thereto. The slab member has a bottom side with at least three angle irons fixedly attached. The slab member is seated within the truck bed for resting on the plurality of rollers of the pair of flat bars and the S-bar. The plurality of rollers of each flat bar are positioned adjacent a respective angle iron. The plurality of rollers of the S-bar are positioned adjacent another of the respective angle irons. The slab member is capable of sliding in and out of the truck bed when positioned on the plurality of rollers for extending beyond the truck bed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cut-away view of the assembly of the angle irons with respect to the rollers.

FIG. 4 is a cut-away view of the S-bar and roller engaging the center angle iron of the slab member.

FIG. 7 is a perspective view of an second embodiment of the present invention.

FIG. 8 is a side view of the second embodiment of the present invention in an extended orientation.

FIG. 9 is a side view of the second embodiment of the present invention in a retracted orientation.

FIG. 10 is a bottom view of the second embodiment of the present invention shown in FIG. 9.

FIG. 11 is a front view of the second embodiment of the present invention as taken along line 11—11 of FIG. 10.

FIG. 12 is a detailed view of the bearing assemblies of the second embodiment encircled in FIG. 11.

FIG. 13 is a detailed view of the pivot rod of the second embodiment of the present invention as taken along line 13—13 of FIG. 8.

FIG. 14 is a perspective view of a third embodiment of the present invention.

FIG. 15 is a side view of the third embodiment of the present invention illustrated in an extended orientation.

FIG. 16 is a cross-sectional view of the third embodiment as taken along line 16—16 of FIG. 15.

FIG. 17 is a partial end view of the third embodiment illustrating the lever thereof.

FIG. 18 is a cross-sectional view of the third embodiment as taken along line 18—18 of FIG. 17.

FIG. 19 is a plan view of the spring loaded locking pin as taken along line 19—19 of FIG. 15.

FIG. 20 is a cross-sectional view of the alternate embodiment as taken along line 20—20 of FIG. 15.

FIG. 21 is an exploded perspective view of the means for coupling the pair of brackets to the truck bed.

Similar reference characters refer to similar parts throughout the several views of the drawings.

DESCRIPTION OF THE PREFERRED EMBODIMENT

Figure 1:
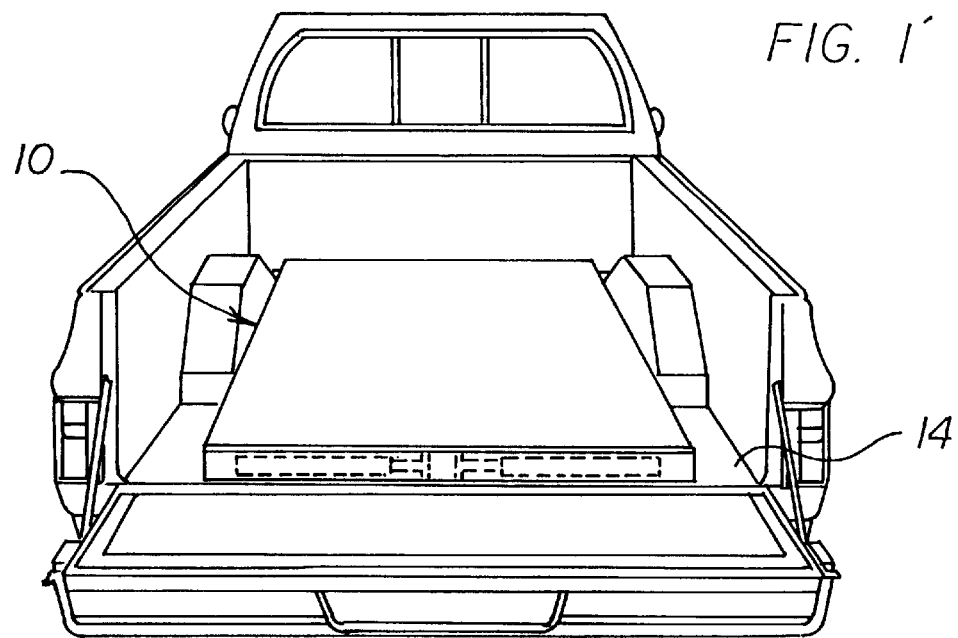
FIG. 1 is a perspective illustration of the preferred embodiment of the slide-a-bed system for a truck constructed in accordance with the principles of the present invention.

With reference now to the drawings, and in particular to FIG. 1 thereof, a new and improved slide-a-bed system for a truck embodying the principles and concepts of the present invention and generally designated by the reference numeral 10 will be described.

The present invention, the new and improved slide-a-bed system for a truck, is comprised of a plurality of components. Such components in their broadest context include a slab member, rollers, angle irons and leg support members. Such components are individually configured and correlated with respect to each other so as to attain the desired objective.

Figure 5:
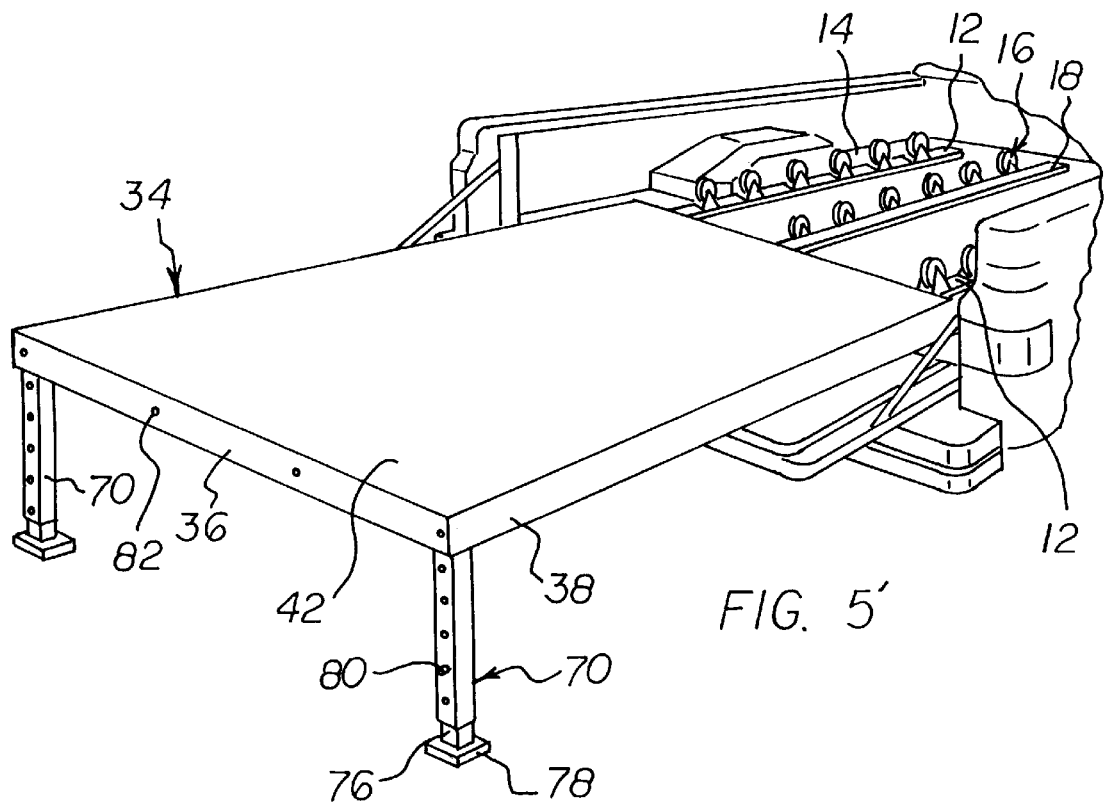
FIG. 5 is an isometric view of the present invention in an operable orientation.

More specifically, it will be noted that the slide-a-bed system for a truck has a pair of flat bars 12. Each flat bar is mounted to a truck bed 14 and has a length equal to about 85 percent of a length of the truck bed. Each flat bar, as shown in FIG. 3, has a plurality of rollers 16 fixedly attached. FIG. 5 shows the plurality of rollers proportionately spaced along the length.

As best illustrated in FIG. 4, an S-bar 18 is mounted to the truck bed. The S-bar is proportionately spaced between the pair of flat bars 12. The S-bar has a length equal to the length of the pair of flat bars. The S-bar has a plurality of rollers 16 fixedly attached thereto and proportionately spaced along the length of the S-bar. The S-bar has a free portion 20 that extends above and away from the a mounted portion of the S-bar.

The plurality of rollers attached to the pair of flat bars and the S-bar are identical. Each roller is a roller assembly that is comprised of a bracket 24, an axle 26 and a wheel 28. Each bracket of each roller assembly is fixedly attached to the flat bar and S-bar by welding. The axle of each roller assembly is fixedly coupled between the arms 30 of each bracket, as shown in FIG. 3. The axle of each roller assembly allows the wheel of each roller assembly to rotate freely while the axle remains stationary. Each wheel of each roller assembly is able to rotate independently of the other wheels of the roller assemblies.

Figure 6:
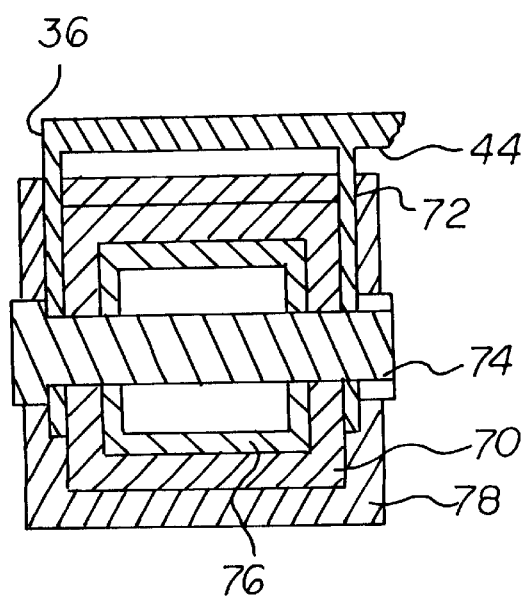
FIG. 6 is a cut-away view of the leg support member of the present invention of FIG. 5.

Also, a generally rectangular slab member 34, as shown in FIG. 5 is provided. The slab member has a front lip 36 and a pair of elongated side portions 38 that are fixedly attached to the front lip. The slab member has a top side 42 and a bottom side 44, as seen in FIGS. 5 and 6 respectively. The bottom side has at least three angle irons 46, 48, and 50 that are fixedly attached. Each of the three angle irons is L-shaped. Each of the three angle irons has an attached member 54 welded onto the bottom side 44 of the slab member, as shown in FIG. 4. Each of the three angle irons has a free member 56 projecting downwardly from the bottom side of the slab member, as shown in FIG. 3. The three angle irons form two outside angle irons 46 and 48, and a center angle iron 50.

Figure 2:
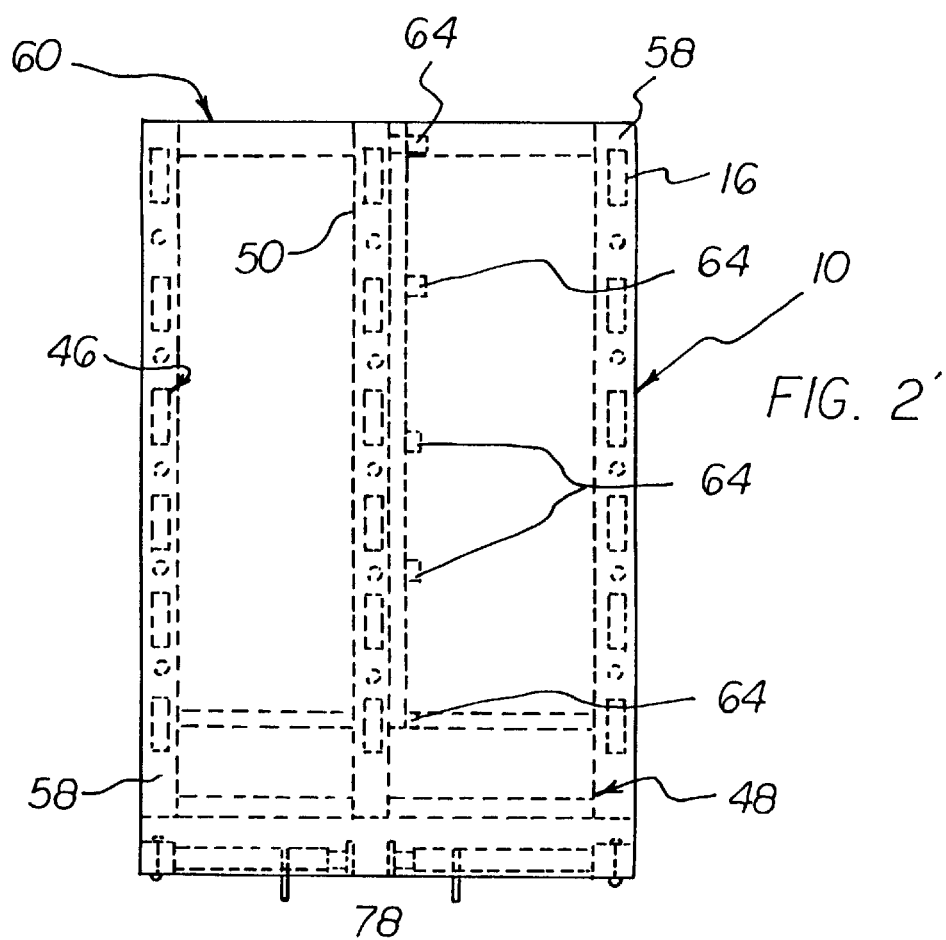
FIG. 2 is a top plan view of the slab member of the present invention of FIG. 1.

One of each of the two outside angle irons has the free member being spaced from one of the pair of elongated side portions, as depicted in FIG. 2, for forming a roller channel 58. The center angle iron is symmetrically spaced between the two outside angle irons. The slab member is seated within the truck bed for resting on the plurality of rollers of the pair of flat bars and the S-bar. The plurality of rollers 16 of each flat bar is positioned within a respective roller channel, as shown in FIG. 2. The slab member is capable of sliding in and out of the truck bed when positioned on the plurality of rollers. FIG. 1 shows the slab member within the truck bed and FIG. 2 shows the slab member hanging out of the truck bed.

Additionally, a plurality of slot cam rollers 64 are provided. Each of the plurality of slot cam rollers 64 is fixedly attached to the center angle iron 50. As shown in FIG. 2, there are five slot cam rollers. Each cam roller has a wheel 65 that moves with the slab member and will the S-bar, as depicted in FIG. 4.

Finally, a pair of leg support members 70 are provided. Each leg support member is rotatably mounted to the front lip 36 of the slab member and a mounting plate 72 by a hinge bolt 74. Each of the leg support members has a leg extension 76, a foot member 78 and a locking pin 80. As shown in FIG. 2, the leg support members are housed under the slab member when it is positioned within the truck bed. Each locking pin will hold the leg support members in a closed position by engaging an opening 82 in the lip of the slab member 42. Each leg extension of each leg support member is telescopingly extendable from within the respective leg support member. FIG. 6 shown the interior structure of each leg support member. The pair of leg support members are capable of supporting the slab member on a receiving surface when the slab member is extended from beyond the truck bed. The adjustability of the leg extension of the leg support member allows the slab member to be supported on uneven surfaces.

The present invention, slide-a-bed system for a truck, is a sliding work table. The slab member of the present invention is structured to be mounted in the back of a pick-up truck. Other uses are loading and unloading materials into trucks with camper tops. The slab member could roll out materials placed on the top side, and then roll the material back in when no longer in use. When used as a work table the present invention can roll out to create at least a 4 by 4 work table. Another feature of the present invention is the adjustable legs on the front. The legs/leg support members can be positioned on uneven terrain. The leg support members aid in stabilizing the work table while using tools, hammers, saws, pipe benders, vices, etc. Finally, tools may be mounted onto the top side of the slab member.

With reference now to FIGS. 7–13, a second embodiment 100 of the present invention will now be set forth. The second embodiment is adapted to be used with a truck bed 110 including a bottom face with a rectangular configuration. The truck bed is equipped with a peripheral side wall including a pair of side faces and a front face coupled to a periphery of the bottom face and extending upwardly therefrom.

The second embodiment of the present invention includes a pair of truck bed angle irons 112. Such truck bed angle irons each have a horizontal extent 114 with a front end pivotally coupled to the bottom face of the truck bed. A rear end of each truck bed angle iron has a rubber bumper 116 mounted on a bottom surface thereof. By this structure, the truck bed irons are adapted to pivot about a horizontal lateral axis. When situated in a horizontal orientation, the truck bed angle irons extend between a midpoint of the truck bed and the front face of the side wall of the truck bed, as shown in FIG. 7. As further shown in such Figure, the vertical extents of the truck bed angle irons each abut one of the side faces of the side wall of the truck bed.

To afford the pivoting nature of the truck bed angle irons, an L-shaped member 118 is mounted on each truck bed angle iron to afford a square housing 120, as shown in FIG. 13. A pivot rod 122 is mounted between side faces of the housing. A bolt is included with an eyelet formed on a top face thereof which is pivotally coupled to the pivot rod. A bottom extent of the bolt extends through an elongated slot 124 formed in the horizontal extent of the corresponding truck bed angle iron. Such bottom extent of the bolt is threaded for coupling with the bottom face of the truck bed.

Spacers 126 are situated about the pivot rod on either side of the bolt for maintaining the bolt in alignment with the slot.

Next provided is a planar, rectangular support plate 128 including a top face, a bottom face, and a periphery defined by a pair of parallel elongated side edges and a pair of parallel short end edges. It should be noted that the support plate has a length and a width equal to those of the bottom face of the truck bed.

Mounted below the support plate is an undercarriage 130 including a pair of longitudinal angle irons 132. Such longitudinal angle irons each have a horizontal extent coupled to the bottom face of the support plate along one of the side edges thereof. By this coupling, a vertical extent of each longitudinal angle iron depends downwardly from the support plate in a spaced relationship with respect to the corresponding side edge thereof.

As shown in FIG. 10, the undercarriage further includes a plurality of lateral angle irons 134 each having a horizontal extent coupled to the bottom face of the support plate. The lateral angle irons are each situated between the longitudinal angle irons in perpendicular relationship therewith. The horizontal extents of frontmost and rearmost lateral angle irons are mounted to the support plate such that the vertical extents thereof remain in a spaced relationship with respect to the corresponding end edge. The horizontal extents of the longitudinal and frontmost and rearmost lateral angle irons are preferably situated flush with the periphery of the support plate, as shown in FIG. 10.

As best shown in FIGS. 8, 11, & 12, two pairs of bearing assemblies 136 are provided. Such bearing assemblies include a first pair of bearing assemblies 138 coupled to an inner face of the vertical extents of the truck bed angle irons. Associated therewith is a second pair of bearing assemblies 140 coupled to an outer face of the vertical extents of the longitudinal angle irons of the undercarriage. As shown in FIG. 8, the second pair of bearing assemblies each extend between a front end of the corresponding longitudinal angle iron and a midpoint thereof.

Also included is a pair of linear connecting members 142 each equipped with a length equal to at least that of the bearing assemblies. The linear connecting members are each slidably connected between one of the first pair of bearing assemblies and one of the second pair of bearing assemblies. As an option, the bearing assemblies and linear connecting members may take the form of JONATHAN slides #432-36 36" stroke each. By this structure, the support plate is adapted to slide in and out of the truck bed in coplanar relationship with a plane including the truck bed angle irons. Further, the support plate is adapted to further pivot about an axis about which the truck bed angle irons are pivotally coupled to the truck bed.

For allowing a user to easily slide the support plate with respect to the truck bed, a pair of U-shaped handles 144 each have a pair of ends coupled to a rear face of the vertical extent of the rearmost lateral angle iron. It should be noted that the handles reside completely beneath the support plate, as shown in FIG. 8. This is critical for space efficiency and ensuring that a rear gate of the truck bed may be closed when the support plate is situated within the truck bed.

Finally, a pair of legs 146 are provided each including an inboard extent 148 having a top end pivotally coupled to an inner surface of one of the longitudinal angle irons. Such coupling is preferably effected adjacent to the rearmost lateral angle iron about an axis which is perpendicular and adjacent the rearmost lateral angle iron. Each leg further has at least one outboard extent 150 having a top end slidably situated within a bottom end of the inboard extent. To selectively fix the outboard extent(s) with respect to the inboard extent, a set screw 152 is included. To maintain the legs in a retracted orientation, a pair of resilient C-shaped clamps 154 are preferably mounted to a bottom surface of the support plate.

Each leg further has a disk-shaped foot pad 156 pivotally coupled to a bottom end of the outboard extent. To allow the foot pad to be pivoted in an desired plane, the coupling between the foot pads and legs are preferably accomplished by way of ball and socket joints 158. As such, the foots may be pivoted to conform to any desired terrain.

In use, the present invention allows the support plate to remain level despite the truck being situated on a rearward slope. This is accomplished by the pivoting nature of the truck bed angle irons and the telescoping capabilities of the legs.

Further options which may be incorporated in the present invention include a tool box and/or electrical outlet mounted on the support plate, a pair of laterally extending extensions pivotally mounted to the side edges of the support plate, a peripheral side wall with pivoting doors mounted to a periphery of the bottom face of the support plate and extended upwardly therefrom, and storage containers removably or slidably mounted on the support plate.

A third embodiment 200 of the present invention is illustrated in FIGS. 14–21. The third embodiment includes many of the features of the preferred and second embodiments of the present invention. The third embodiment includes two main components: a pair of brackets 202 and a support plate 204. As illustrated in FIG. 14, the pair of brackets 202 have a plurality of cross members 206 extending therebetween. The cross members 206 receiving bolts 207 therethrough to facilitate securement to the truck bed. The details of the bolts 207 will be described in greater detail hereinafter. The pair of brackets 202 each are comprised of a hollow tube with a square cross-section. Each of the brackets 202 have a plurality of apertures 208 through interior side walls thereof in a spaced relationship and extending an entire length thereof. Each of the brackets 202 have an open interior wall 210. The support plate 204 has a pair of braces 212 extending downwardly from a lower surface thereof. Each of the braces 212 have a plurality of rollers 214 disposed thereon in a spaced relationship and extending a length thereof whereby the rollers 214 are positioned within the pair of brackets 202 to facilitate slidably mounting with respect thereto. Note FIG. 16. Additionally, a pair of cam restraints 216 are provided to limit the sliding of the support plate 204 with respect to the pair of brackets 202.

A pair of tubes 218 disposed on the lower surface of the support plate 204 inwardly of the braces 212. The tubes 218 each have open outer ends coincident with an outer end of the support plate 204.

A pair of support legs 220 are slidably disposed within the pair of outer tubes 218 in a stored orientation. Note FIG. 16. The support legs 220 extend outwardly of the tubes 218 and pivot to a vertical position in an extended orientation. Note FIG. 15. The support legs 220 each have a pivotable disk 222 disposed on lower ends thereof. The pivotable disk 222 allows for the support legs 220 to be properly balanced when on uneven terrain. The legs are adjustable up to one foot and may be released by hand or by foot so as to remove the weight and slide the load in and out.

The third embodiment includes means to stop the sliding of the support plate 204 with respect to the pair of brackets 202 prior to the support plate 204 being fully extended. This feature is desired when an operator starts to lose control of the support plate 204 and wishes to stop it from sliding before any damage is done. This could occur when the device is utilized on a hill or the like. The means to stop the sliding of the support plate, as illustrated in FIGS. 17–19, includes a spring-loaded locking pin disposed 224 within each of the pair of braces 212 of the support plate 204. Each locking pin 224 has a cable 226 extending outwardly therefrom. A free end of the cable 226 extends outwardly of the outer end of the support plate 204. The free end of the cable 226 couples with a switch 228 pivotably disposed on the outer end of the support plate 204 whereby pivoting of the switch 228 will cause the cable 226 to tug on the locking pin 224 thereby causing the locking pin 224 to slide outwardly and engage one of the plurality of apertures 208 through the interior side walls of the pair of brackets 202.

The bolts 207 securing the pair of braces 202 of the truck bed are illustrated in greater detail in FIGS. 20 and 21. The bolts 207 extending through apertures 230 in the cross members 206. The bolts 207 are then received within threaded tubes 232 which are positioned within holes 234 drilled within an existing cross member 236 of the truck bed. An open lower end of the threaded tubes 232 are secured in place by a second bolt 238 below the existing cross member 236 of the truck bed. Additionally, the threaded tubes 232 each having a washer 240 integrally coupled with an upper end thereof. A second washer 242 is used with respect to the second bolt 238.

The present invention holds up to 1,000 pounds full, extended at 52 inches out of the truck. Evenly distributed, it may hold up to 3,500 pounds.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A slide-a-bed system for a vehicle comprising:
   a pair of brackets mounted within a vehicle bed; and
   a support plate slidably mounted with respect to the brackets;
   the pair of brackets further include a plurality of cross members extending therebetween, the cross members receiving bolts therethrough to facilitate securement to the truck bed, the pair of brackets each being comprised of a hollow tube with a square cross-section, each of the brackets having a plurality of apertures through interior side walls thereof in a spaced relationship and extending an entire length thereof, each of the brackets having an open interior wall, the support plate having a pair of braces extending downwardly from a lower surface thereof, each of the braces having a plurality of rollers disposed thereon in a spaced relationship and extending a length thereof whereby the rollers are slidably mounted within the pair of brackets;
   a pair of tubes disposed on the lower surface of the support plate inwardly of the braces, the tubes each having open outer ends coincident with an outer end of the support plate;
   a pair of support legs slidably disposed within the pair of outer tubes in a stored orientation, the support legs extending outwardly of the tubes and pivoting to a vertical portion in an extended orientation.

2. The slide-a-bed system for a truck as set forth in claim 1 wherein the support legs each have a pivotable disk disposed on lower ends thereof.

3. The slide-a-bed system for a truck as set forth in claim 2 and further including means to stop the sliding of the support plate with respect to the pair of brackets prior to the support plate being fully extended.

4. The slide-a-bed system for a truck as set forth in claim 3 wherein the means to stop the sliding of the support plate includes a spring-loaded locking pin disposed within each of the pair of braces of the support plate, each locking pin having a cable extending outwardly therefrom, a free end of the cable extending outwardly of the outer end of the support plate, the free end of the cable coupling with a thumb switch pivotably disposed on the outer end of the support plate whereby pivoting of the thumb switch will cause the cable to tug on the locking pin thereby causing the locking pin to slide outwardly and engage one of the plurality of apertures through the interior side walls of the pair of brackets.

5. A slide-a-bed system for a truck comprising in combination:
   a pair of flat bars being mounted to a truck bed and having a plurality of rollers fixedly attached thereto;
   an elongated bar having an S-shaped cross-section being mounted to the truck bed and spaced between the pair of flat bars, and having a plurality of rollers fixedly attached thereto; and
   a generally rectangular slab member having a front lip and a pair of elongated side portions being fixedly attached thereto, the slab member having a bottom side with at least three angle irons fixedly attached thereto, the slab member being seated within the truck bed for resting on the plurality of rollers of the pair of flat bars and the elongated bar, the plurality of rollers of each flat bar being positioned adjacent a respective angle iron, the plurality of rollers of the elongated bar being positioned adjacent another of the respective angle irons, the slab member capable of sliding in and out of the truck bed when positioned on the plurality of rollers for extending beyond the truck bed.

6. The slide-a-bed system for a truck as set forth in claim 5, the flat bar having a length equal to about 85 percent of a length of the truck bed, and each flat bar having the plurality of rollers proportionately spaced along the length.

7. The slide-a-bed system for a truck as set forth in claim 5, the elongated bar having a length equal to the length of the pair of flat bars, the plurality of rollers being proportionately spaced along the length.

8. The slide-a-bed system for a truck as set forth in claim 5, each of the three angle irons having a free member projecting downwardly from the bottom side of the slab member, and the three angle irons forming two outside angle irons and a center angle iron.

9. The slide-a-bed system for a truck as set forth in claim 8, each of the two outside angle irons having the free member being spaced from the pair of elongated side portions for forming a roller channel, the center angle iron being symmetrically spaced between the two outside angle irons, and the plurality of rollers of each flat bar being positioned within the respective roller channel of the slab member.

10. The slide-a-bed system for a truck as set forth in claim 12 and further including a pair of leg support members being rotatably mounted to the lip of the slab member.

11. The slide-a-bed system for a truck as set forth in claim 10, each of the leg support members having a leg extension and a foot member, the leg extension of each leg support member being telescopingly extendable from within the respective leg support member, and the pair of leg support members being capable of supporting the slab member on a receiving surface when the slab member being extended from beyond the truck bed.

12. A slide-a-bed system for a truck comprising in combination:
   a pair of flat bars being mounted to a truck bed and having a length equal to about 85 percent of a length of the truck bed, each flat bar having a plurality of rollers fixedly attached thereto and proportionately spaced along the length thereof;
   an elongated bar having an S-shaped cross-section being mounted to the truck bed and proportionately spaced between the pair of flat bars, the elongated bar having a length equal to the length of the pair of flat bars, the elongated bar having a plurality of rollers fixedly attached thereto and proportionately spaced along the length thereof;
   a generally rectangular slab member having a front lip and a pair of elongated side portions being fixedly attached thereto, the slab member having a top side and a bottom side with at least three angle irons fixedly attached thereto, each of the three angle irons having a free member projecting downwardly from the bottom side of the slab member, the three angle irons forming two outside angle irons and a center angle iron, one of each of the two outside angle irons having the free member being spaced from one of the pair of elongated side portions for forming a roller channel, the center angle iron being symmetrically spaced between the two outside angle irons, the slab member being seated within the truck bed for resting on the plurality of rollers of the pair of flat bars and the elongated bar, the plurality of rollers of each flat bar being positioned within a respective roller channel, the slab member capable of sliding in and out of the truck bed when positioned on the plurality of rollers;
   a plurality of slot cam rollers mounted on the angle irons and capable of engaging the elongated bar;
   and a pair of leg support members being rotatably mounted to the lip of the slab member, each of the leg support members having a leg extension and a foot member, the leg extension of each leg support member being telescopingly extendable from within the respective leg support member, the pair of leg support members being capable of supporting the slab member on a receiving surface when the slab member is extended from beyond the truck bed.

* * * * *